United States Patent [19]
Liberti, Jr. et al.

[11] Patent Number: 5,550,872
[45] Date of Patent: Aug. 27, 1996

[54] METHOD AND APPARATUS FOR FAST FOURIER TRANSFORM BASED MAXIMAL RATIO COMBINING

[75] Inventors: Joseph C. Liberti, Jr., Blacksburg, Va.; Douglas I. Averst, Delray Beach, Fla.; Tony R. Branch; Stephen R. Carsello, both of Boynton Beach, Fla.

[73] Assignee: Motorola, Inc., Schaumburg, Ill.

[21] Appl. No.: 327,753

[22] Filed: Oct. 24, 1994

[51] Int. Cl.$^6$ ................................ H04B 7/02; H04L 1/02
[52] U.S. Cl. ........................ 375/347; 375/267; 455/137; 455/273
[58] Field of Search .................... 375/267, 347; 455/137, 138, 140, 273; 364/725–726

[56] References Cited

U.S. PATENT DOCUMENTS

| | | | |
|---|---|---|---|
| 3,783,385 | 1/1974 | Dunn et al. | 375/267 |
| 4,017,859 | 4/1977 | Medwin | 455/137 |
| 5,046,066 | 9/1991 | Messenger | 375/267 |
| 5,191,598 | 3/1993 | Bäckström et al. | 375/347 |
| 5,203,026 | 4/1993 | Ekelund | 455/134 |
| 5,325,403 | 6/1994 | Siwiak et al. | 375/347 |
| 5,367,539 | 11/1994 | Copley | 375/347 |
| 5,450,612 | 9/1995 | Chanroo et al. | 455/38.1 |

Primary Examiner—Young T. Tse
Attorney, Agent, or Firm—R. Louis Breeden

[57] ABSTRACT

A method and apparatus diversity-combine radio signals received from a plurality of branches (108, 214). Each radio signal comprises a plurality of subchannels (806). The radio signal from each branch (108, 214) is digitized (904) into digital samples that are converted (908, 910) into frequency domain signals (702, 712). Each frequency domain signal (702, 712) corresponds to a subchannel and a branch (108, 214). A weighting factor is determined (916) for each branch (108, 214) and each subchannel (806) from instantaneous signal energy and noise power calculated (912, 914) from the frequency domain signals (702, 712). The frequency domain signal (702, 712) corresponding to each branch (108, 214) and each subchannel (806) is multiplied (918) by the weighting factor therefor to produce weighted frequency domain signals corredponding to each branch and each subchannel. The weighted frequency domain signals that correspond to all the branches (108, 214) of each subchannel (806) are then combined (920) to produce a diversity-combined frequency domain signal for each subchannel (806).

21 Claims, 6 Drawing Sheets

218

222

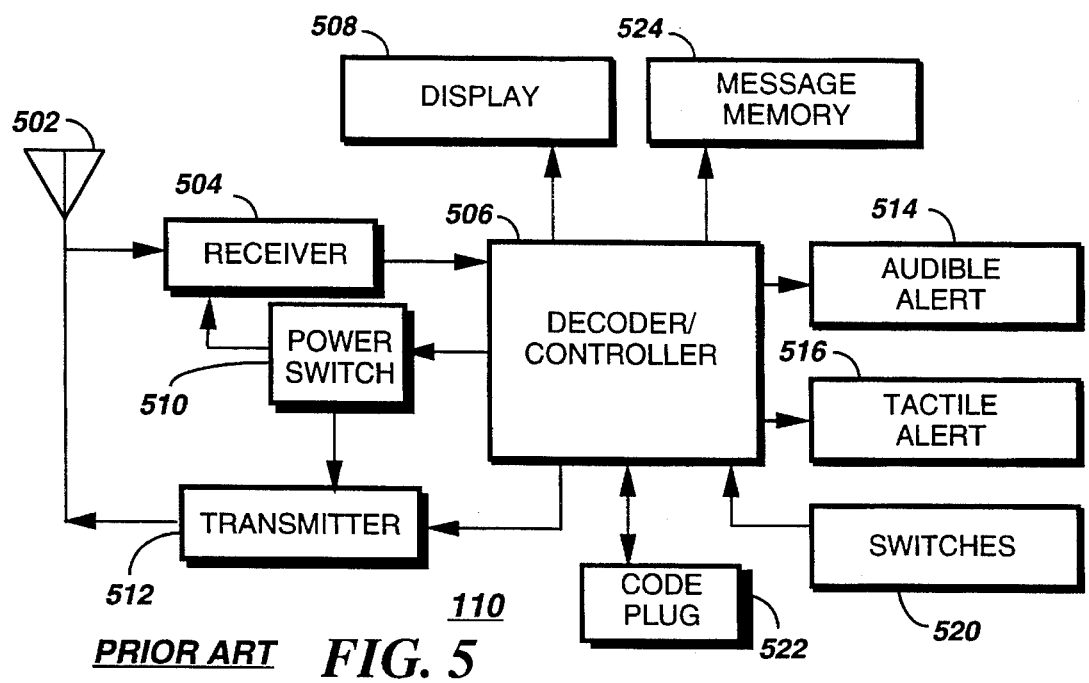
PRIOR ART *FIG. 5*
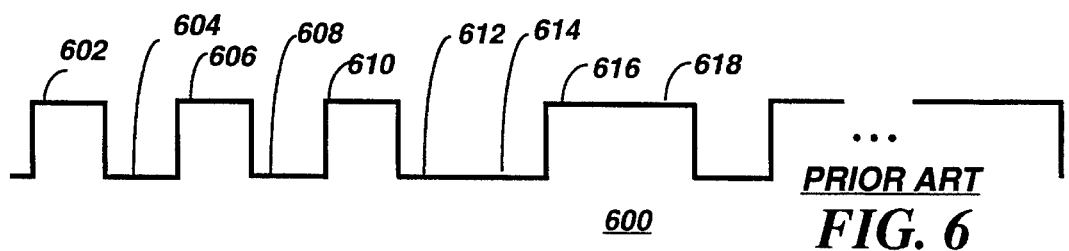
PRIOR ART *FIG. 6*
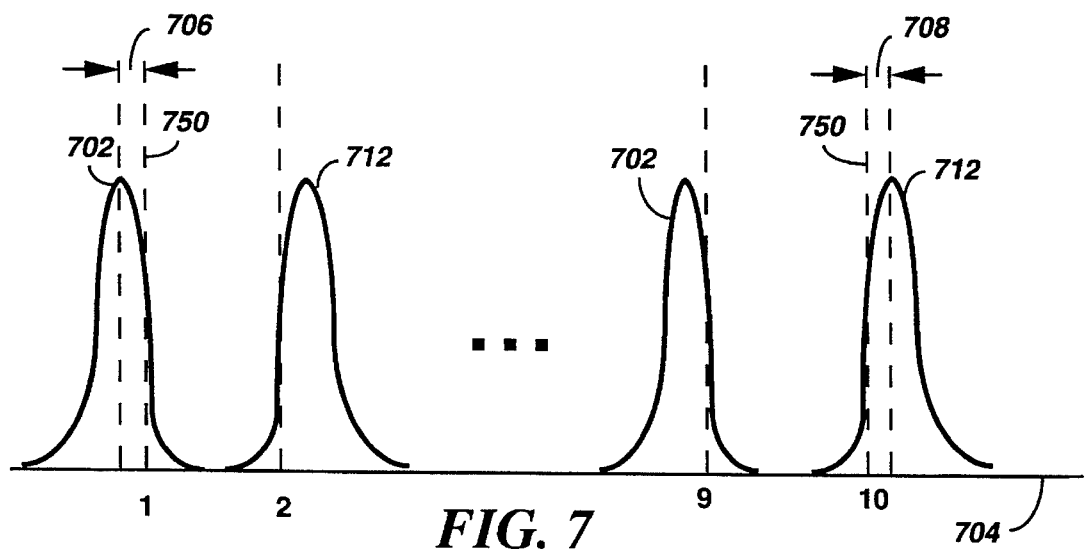
*FIG. 7*

METHOD AND APPARATUS FOR FAST FOURIER TRANSFORM BASED MAXIMAL RATIO COMBINING

RELATED APPLICATIONS

Application Ser. No. 08/112,156 filed Aug. 26, 1993 by Chanroo et al., entitled "Communication System for Communicating with a plurality of Selective Call Receivers and Method Therefor", now U.S. Pat. No. 5,450,612.

Application Ser. No. 08/316,956 filed Oct. 10, 1994 by Liberti et al., entitled "Method and Apparatus for Carrier Tracking and Demodulation."

FIELD OF THE INVENTION

This invention relates in general to radio communication receivers, and more specifically to a method and apparatus for Fast Fourier Transform based maximal ratio combining in a radio communication receiver system.

BACKGROUND OF THE INVENTION

In narrowband radio channels transmitted by portable radio units, varying multiple reception paths cause the signal strength at the receiver to vary. The variation depends on the environment and the motion of the transmitter and receiver relative to features of the environment. Often, the received signal strength of a faded signal can be characterized by a Rayleigh probability density function. The time duration and frequency of occurrence of the nulls depend on carrier frequency and the speed of the portable unit.

A fade may eliminate a large portion of the energy in the signal at the receiver for some time duration. In a digital system, this can lead to burst errors in which the bit error rate becomes very high over a period of time, even though the average signal strength is sufficient to provide a low bit error rate if no fading has occurred.

If two receivers are receiving a signal transmitted by the same portable transmitter, the fading of the envelope of the signal at the two receivers will be uncorrelated if the receivers are separated by more than a few wavelengths. It is less likely that two receivers will experience a fade at the same time than it is that a single receiver will experience a fade. A technique which takes advantage of this fact is spatial diversity where the signals from two or more receivers, with antennas spatially separated, are combined to reduce the effects of fading. More than two receivers, or branches, may be used. As the number of branches increases, the effects of fading are further reduced.

There are a number of techniques which have been used to combine signals from each of the branches. One of the simplest techniques is known as selection diversity. In this technique, a central processor scans all of the branches for the receiver with the highest signal strength. At any moment in time, the central processor takes its input from the branch with the highest signal strength. Further gains can be achieved by coherently combining the signals from each branch, and adjusting the gain from each branch "on-the-fly" to achieve the maximum signal-to-noise ratio out of the combiner. This is known as maximal ratio combining.

In a conventional system in which multiple binary FSK signals are transmitted simultaneously on multiple subchannels, one way of receiving and performing maximal ratio combining has been to utilize a plurality of narrowband receivers tuned to each of the subchannels and fed from each of the branches. Signals from the plurality of receivers have then been fed to a conventional maximal ratio combiner for producing a combined signal for each subchannel. Unfortunately, the complexity and cost of the conventional system increases in proportion to the number of subchannels, making the conventional system undesirable for more than a limited number of subchannels.

Thus, what is needed is an economical method and apparatus for receiving and maximal ratio combining a plurality of radio signals received from a plurality of branches, wherein each of the radio signals comprises a moderate to large number of subchannels.

SUMMARY OF THE INVENTION

An aspect of the present invention is a method for diversity-combining a plurality of radio signals, each radio Signal received from one of a plurality of branches fed from a corresponding plurality of antennas, and each radio signal comprising a plurality of subchannels. The method comprises the steps of digitizing the radio signal from each branch of the plurality of branches to form a plurality of digitized samples corresponding thereto, and converting the plurality of digitized samples into a plurality of frequency domain signals. Each frequency domain signal corresponds to a subchannel of the plurality of subchannels and further corresponds to a branch of the plurality of branches. Each frequency domain signal comprises a plurality of frequency domain samples corresponding to a plurality of frequencies within each subchannel. The method further comprises the step of determining a weighting factor for each branch and each subchannel. The weighting factor is determined from instantaneous signal energy and noise power. The instantaneous signal energy and the noise power are calculated from the plurality of frequency domain signals. The method also includes the step of multiplying the frequency domain signal corresponding to each branch and each subchannel by the weighting factor therefor to produce a plurality of weighted frequency domain signals corresponding to each branch and each subchannel. In addition, the method includes the step of combining the plurality of weighted frequency domain signals that correspond to all the branches of each subchannel to produce a diversity-combined frequency domain signal for each subchannel.

Another aspect of the present invention is an apparatus for diversity-combining a plurality of radio signals. Each radio signal is received from one of a plurality of branches fed from a corresponding plurality of antennas. Each radio signal comprises a plurality of subchannels. The apparatus comprises a plurality of analog-to-digital (A/D) converters coupled to the plurality of branches for digitizing the radio signal from each branch of the plurality of branches to form a plurality of digitized samples corresponding thereto. The apparatus further comprises a plurality of branch processors coupled to the plurality of A/D converters for converting the plurality of digitized samples into a plurality of frequency domain signals. Each frequency domain signal corresponds to a subchannel of the plurality of subchannels and further corresponds to a branch of the plurality of branches. Each frequency domain signal comprises a plurality of frequency domain samples corresponding to a plurality of frequencies within each subchannel. Each branch processor comprises a weighting factor element for determining a weighting factor for each subchannel of the branch from which the branch processor receives the radio signal after digitization. The weighting factor is determined from instantaneous signal energy and noise power. The instantaneous signal energy and the noise power are calculated from the plurality of frequency domain signals. The branch processor further comprises a multiplier coupled to the weighting factor element for multiplying the frequency domain signal corresponding to the branch and each subchannel thereof by the weighting factor therefor to produce a plurality of weighted frequency domain signals corresponding to the branch and each subchannel. The apparatus further comprises a combiner coupled to the plurality of branch processors for combining the plurality of weighted frequency domain signals that correspond to all the branches of each subchannel to produce a diversity-combined frequency domain signal for each subchannel.

Another aspect of the present invention is a selective call base station for use in a selective call communication system. The selective call base station comprises a controller for controlling the selective call base station, and a base transmitter coupled to the controller for transmitting selective call signals to selective call transceivers operating in the selective call communication system. The selective call base station further comprises a plurality of branches comprising a plurality of antennas and a corresponding plurality of receiver elements for receiving from transmitters within the selective call transceivers a plurality of radio signals. Each radio signal is received by one of the plurality of receiver elements fed from one of the plurality of antennas. Each radio signal comprises a plurality of subchannels. The plurality of receiver elements are also coupled to an apparatus for diversity-combining the plurality of radio signals. The apparatus comprises a plurality of analog-to-digital (A/D) converters coupled to the plurality of branches for digitizing the radio signal from each branch of the plurality of branches to form a plurality of digitized samples corresponding thereto. The apparatus further comprises a plurality of branch processors coupled to the plurality of A/D converters for converting the plurality of digitized samples into a plurality of frequency domain signals. Each frequency domain signal corresponds to a subchannel of the plurality of subchannels and further corresponds to a branch of the plurality of branches. Each frequency domain signal comprises a plurality of frequency domain samples corresponding to a plurality of frequencies within each subchannel. Each branch processor comprises a weighting factor element for determining a weighting factor for each subchannel of the branch from which the branch processor receives the radio signal after digitization. The weighting factor is determined from instantaneous signal energy and noise power. The instantaneous signal energy and the noise power are calculated from the plurality of frequency domain signals. The branch processor further comprises a multiplier coupled to the weighting factor element for multiplying the frequency domain signal corresponding to the branch and each subchannel thereof by the weighting factor therefor to produce a plurality of weighted frequency domain signals corresponding to the branch and each subchannel. The apparatus further comprises a combiner coupled to the plurality of branch processors for combining the plurality of weighted frequency domain signals that correspond to all the branches of each subchannel to produce a diversity-combined frequency domain signal for each subchannel.

BRIEF DESCRIPTION OF THE DRAWINGS

FIG. 5 is an electrical block diagram of a conventional selective call transceiver.

FIG. 6 is a timing diagram illustrating an example of a bit pattern of an acknowledgment signal of one of a group of conventional selective call transceivers.

FIG. 7 is a signaling diagram depicting a frequency-domain signal generated from a received signal in the selective call base station in accordance with the preferred embodiment of the present invention.

DESCRIPTION OF THE PREFERRED EMBODIMENT

Figure 1:
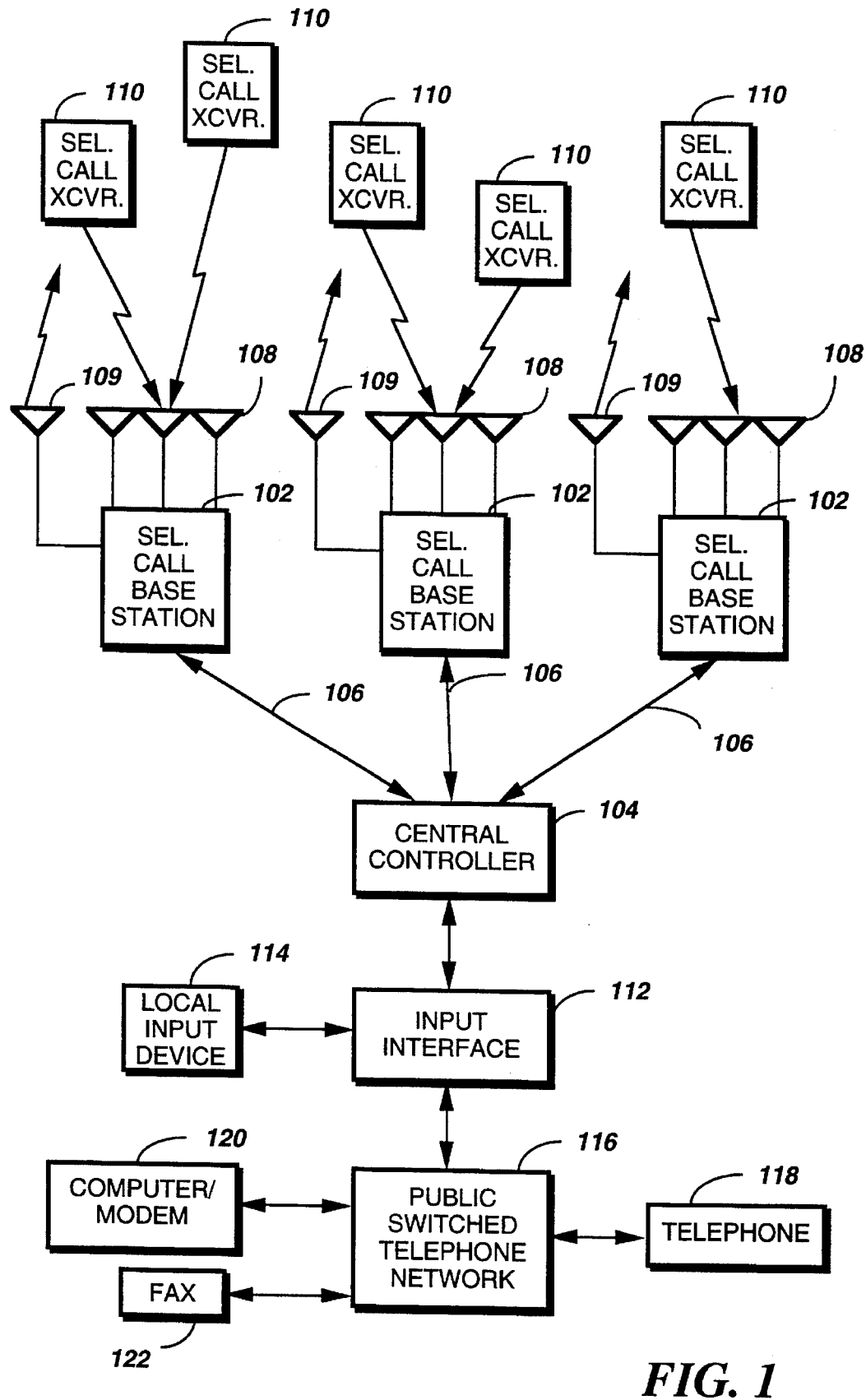
FIG. 1 is an electrical block diagram of a selective call communication system in accordance with the preferred embodiment of the present invention.

With reference to FIG. 1, an electrical block diagram of a selective call communication system in accordance with the preferred embodiment of the present invention comprises a plurality of selective call base stations 102 coupled by communication links 106 to a conventional central controller 104 for controlling the selective call base stations 102. The central controller 104 is preferably similar to the MPS 2000™ paging control center manufactured by Motorola, Inc. of Schaumburg, Ill. Other similar controllers can be utilized as well for the central controller 104. Each of the selective call base stations 102 transmits radio signals to a plurality of selective call transceivers 110 via a transmitting antenna 109. The selective call base stations 102 receive radio signals from the plurality of selective call transceivers 110 via a plurality of receiving antennas 108, multiple receiving antennas 108 being coupled to each selective call base station 102. The receiving antennas 108 coupled to each selective call base station 102 preferably are separated from one another by at least ten wavelengths, so that the radio signals received by the receiving antennas 108 are substantially uncorrelated. The radio signals comprise selective call addresses and messages transmitted to the selective call transceivers 110 and acknowledgments received from the selective call transceivers 110. It will be appreciated that the selective call transceivers 110 can also originate messages other than acknowledgments. The central controller 104 is coupled to an input interface 112 for accepting selective call originations from a local input device 114, e.g., a conventional keyboard/display terminal, and from the public switched telephone network (PSTN) 116. Selective call originations from the PSTN 116 can be generated, for example, from a conventional telephone 118, a conventional computer/modem 120, or a conventional facsimile machine 22 coupled to the PSTN 116 in a manner that is well known in the art.

Transmissions between the selective call base stations 102 and the selective call transceivers 110 preferably utilize a well-known selective calling signaling protocol, such as the Golay Sequential Code (GSC) or Post Office Code Standardization Advisory Group (POCSAG) protocol. Outbound transmissions from the selective call base stations 102 preferably utilize binary frequency shift keyed (FSK) modulation, operating in the range of five-hundred to twenty-four-hundred bits-per-second (bps). Inbound transmissions from the selective call transceivers 110 to the selective call base stations 102 preferably utilize narrowband binary FSK modulation at a rate of one-hundred bps, transmitted on at least one subchannel. It will be appreciated that other signaling protocols, and FSK modulation schemes can be utilized as well for either or both transmission directions. It will be further appreciated that other transmission rates can be used as well, as long as the symbol duration of the inbound transmissions is large relative to the propagation delay thereof, so that the symbols can be received synchronously.

Figure 2:
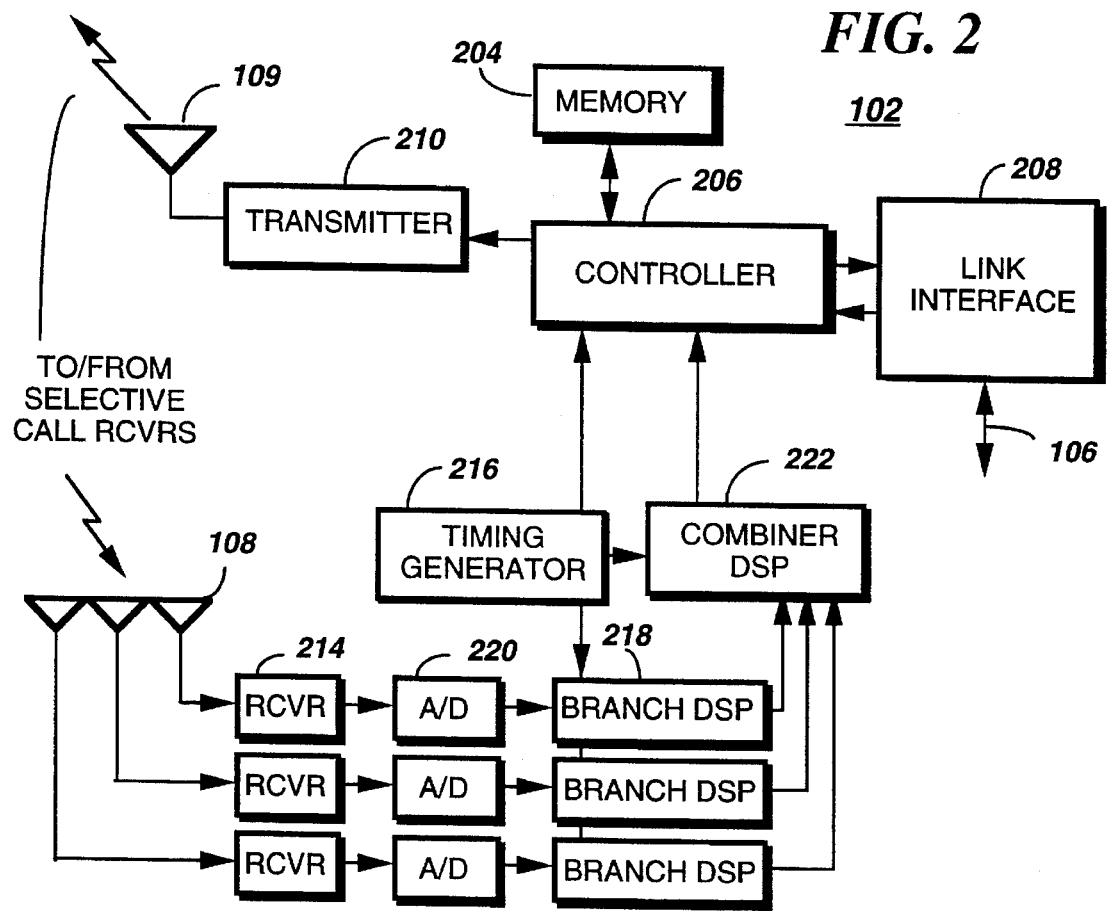
FIG. 2 is an electrical block diagram of a selective call base station in accordance with the preferred embodiment of the present invention.

With reference to FIG. 2, an electrical block diagram of the selective call base station 102 in accordance with the preferred embodiment of the present invention comprises a conventional link interface 208 coupled to the central controller 104 by the communication link 106. Selective call addresses and messages received from the central controller 104 are stored in a conventional memory 204 until the next transmission cycle.

The link interface 208 is coupled to a controller 206, which controls the operation of a conventional transmitter 210. An example of a controller suitable for use in the present invention is Motorola's MC6809 controller. A conventional timing generator 216, coupled to the controller 206, provides a high accuracy clock to maintain system timing for communication and synchronization of the selective call communication system including the selective call base stations 102 and the plurality of selective call transceivers 110 by techniques known to one of ordinary skill in the art.

Operationally, the transmitter 210 transmits, to the plurality of selective call transceivers 110, a signal which comprises a paging type message preferably on a first frequency at the beginning of the transmission cycle. Preferably, a group of the selective call transceivers 110 are intended (addressed) by the transmitter 210 to receive a paging message. As is well known, the paging message before transmission is encoded with the appropriate address for addressing the group of selective call transceivers of the plurality of selective call transceivers 110. For example, and according to the preferred embodiment of the present invention, when a group of the plurality of the selective call transceivers 110 have been paged, the selective call transceivers 110 of the group that received the message preferably each will substantially simultaneously transmit acknowledgment responses during bit (symbol) intervals on temporarily assigned narrowband subchannels of a second communication channel operating on a second frequency. Preferably, the symbol duration of the acknowledgment responses is large relative to the propagation delay thereof, so that the symbols can be received synchronously Multiple branches, each comprising a receiver element 214 and one of the receiving antennas 108, receive the acknowledgment responses. As is well known, the receiver element 214 demodulates the acknowledgment signals to produce preferably a near-baseband signal.

The near-baseband signal corresponding to a single symbol (bit) interval from each of the branches is converted (digitized) from an analog signal to a sampled digital signal by an analog-to-digital (A/D) converter 220, well-known to one of ordinary skill in the art. One A/D converter 220 is preferably dedicated to each branch. In addition, the A/D converter 220 preferably operates at 32,000 complex samples per second, and thus takes three-hundred-twenty complex samples of each bit at the one-hundred bit-per-second bit rate. The conversion by the A/D converter 220 is received, buffered over the symbol interval, and then converted into frequency domain samples corresponding to each symbol interval and each subchannel by a plurality of branch digital signal processors (DSPs) 218. The branch DSPs 218, for example, can include a Motorola DSP56100 or a Texas Instrument TMS3000 series digital signal processor. It will be appreciated that other similar DSPs can be used as well for the branch DSPs 218, and that other sampling rates and bit rates can be selected for use in the selective call communication system. It also will be appreciated that the transmitter 210 can be positioned remotely from the other elements of the selective call base station 102, and that the selective call communication system can include receive-only stations similar to the selective call base station 102 but lacking the transmitter 210.

According to the preferred embodiment of the present invention, the branch DSPs 218 convert and store the frequency domain samples corresponding to each symbol interval on each subchannel of each branch and continuously receive, convert, and store the frequency domain samples until a plurality of frequency domain samples of the acknowledgment signals have been stored. The digitized samples for each branch are retrieved and converted into frequency domain signals. Preferably, the branch DSPs 218 perform a Fast Fourier Transform (FFT) on time domain samples of each symbol interval to generate the frequency domain signal for each branch and each subchannel, which signal is generated from the plurality of acknowledgment signals received as a composite time domain signal from the responding selective call transceivers 110 of the group of selective call transceivers 110. The branch DSPs 218 then determine a weighting factor for each branch and each subchannel, based upon instantaneous signal energy and average noise power, and multiply the frequency domain signal corresponding to each branch and subchannel by the weighting factor. The resultant weighted frequency domain signals are then combined in a combiner DSP 222 to produce a diversity-combined frequency domain signal for each subchannel. The combiner DSP 222 preferably is of a type similar to the branch DSPs 218. The timing generator 216 is coupled to the branch DSPs 218 and to the combiner DSP 222 to provide synchronization and timing for processing the plurality of digitized samples comprising the plurality of acknowledgment signals. The operation of the branch DSPs 218 and the combiner DSP 222 will be discussed in greater detail below.

Figure 3:
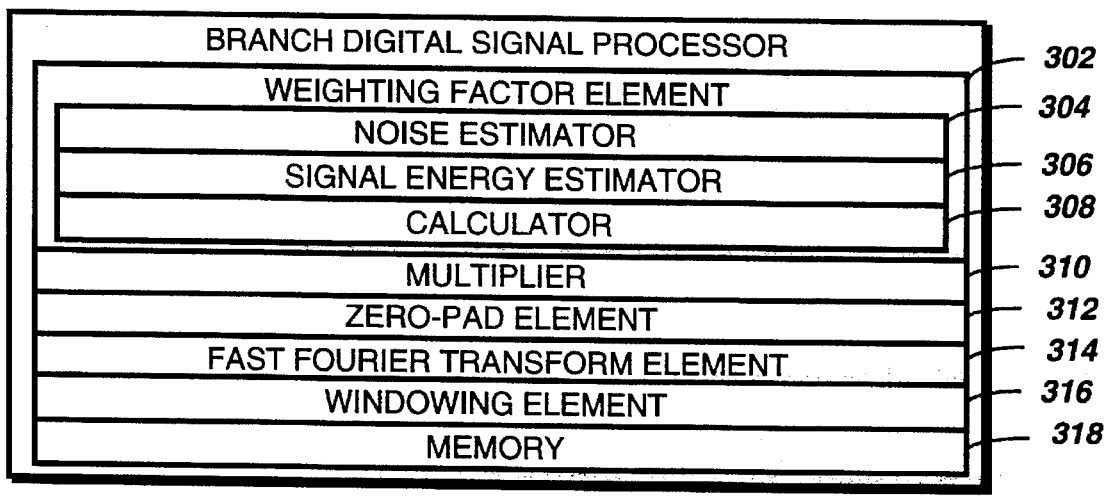
FIG. 3 is a diagram depicting firmware and memory elements in a branch processor in accordance with the preferred-embodiment of the present invention.

With reference to FIG. 3, a diagram depicts firmware and memory elements in the branch DSP 218 for processing each subchannel of each branch in accordance with the preferred embodiment of the present invention. The firmware elements comprise a weighting factor element 302 for determining a weighting factor for each subchannel of the branch from which the branch DSP 218 receives the radio signal after digitization. The weighting factor is determined from instantaneous signal energy and noise power calculated from the plurality of frequency domain signals. The weighting factor element comprises a noise estimator 304 for calculating a first average magnitude squared value of the frequency domain signals corresponding to the branch to which the branch DSP 218 is coupled, throughout the upper and lower guard bands of the plurality of subchannels. The noise estimator 304 estimates the noise power of the branch to be equal to the first average magnitude squared value calculated therefor from guard band measurements, as will be described in further detail herein below. The weighting factor element 302 further comprises a signal energy estimator 306 for calculating a second average magnitude squared value of the frequency domain signal corresponding to the branch and to each subchannel thereon throughout the information band. The instantaneous signal energy corresponding to the branch and each subchannel thereon is then estimated to be equal to the second average magnitude squared value calculated therefor. The weighting factor element 302 further comprises a calculator 308 for calculating the weighting factor for the branch and each subchannel as equal to the square root of the instantaneous signal energy corresponding to the branch and each subchannel, divided by the noise power corresponding to the branch.

The branch DSP 218 further comprises a multiplier 310 for multiplying the frequency domain signal corresponding to the branch and each subchannel thereof by the weighting factor therefor to produce a plurality of weighted frequency domain signals corresponding to the branch and each subchannel. The branch DSP 218 also includes a zero-pad element 312 for increasing the plurality of digitized samples to an integer power of two, and a Fast Fourier Transform (FFT) element 314 for performing a Fast Fourier Transform on the plurality of digitized samples after zero-padding to generate the plurality of frequency domain samples corresponding to the plurality of frequencies within each subchannel. In addition, the branch DSP 218 includes a windowing element 316 for windowing the plurality of digitized samples by applying a Hanning window prior to the step of increasing the plurality of digitized samples to an integer power of two. Preferably, the Hanning Window matches an amplitude Hanning window applied at the transmitter 512 to reduce splatter, as is well known in the art. The branch DSP 218 further comprises a memory 318 for temporary storage of interim values and calculations performed in accordance with the preferred embodiment of the present invention.

Figure 4:
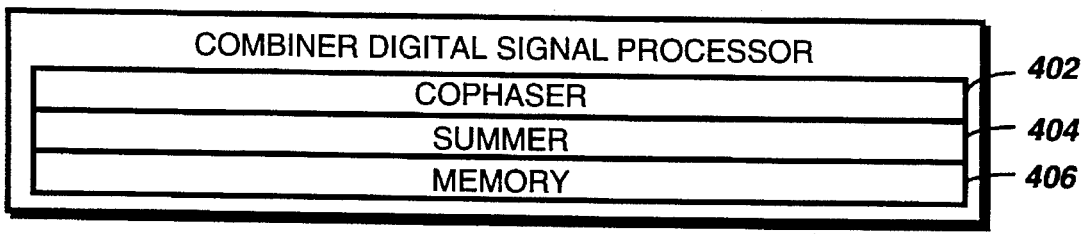
FIG. 4 is a diagram depicting firmware and memory elements in a combiner in accordance with the preferred embodiment of the present invention.

With reference to FIG. 4, a diagram depicting firmware and memory elements in the combiner DSP 222 in accordance with the preferred embodiment of the present invention comprises a cophaser 402 for cophasing the plurality of weighted frequency domain signals that correspond to all the branches of each subchannel to produce a plurality of weighted cophased frequency domain signals. The combiner DSP 222 further comprises a summer 404 for summing the plurality of weighted cophased frequency domain signals to produce a diversity-combined frequency domain signal for each subchannel. The combiner DSP 222 further comprises a memory 406 for temporary storage of interim values and calculations performed in accordance with the preferred embodiment of the present invention. The manner in which the elements of the branch DSPs 218 and the combiner DSP 222 cooperate to produce the diversity-combined frequency domain signal for each subchannel will be described further herein below.

With reference to FIG. 5, an electrical block diagram of the conventional selective call transceiver 110 includes an antenna 502 for intercepting the transmitted radio signals which are coupled to the input of a conventional receiver 504. The radio signals are preferably selective call (paging) message signals which provide, for example, a receiver address and an associated message, such as numeric or alphanumeric message. However, it will be appreciated that other well known paging signaling formats, such as tone only signaling or tone and voice signaling, would be suitable for use as well.

The receiver 504 processes the radio signals and produces at the output a data stream representative of demodulated data information. The demodulated data information is coupled into the input of a decoder/controller 506 which processes the information in a manner well known in the art. A transmitter 512 is coupled to the antenna 502 and to the decoder/controller 506. The transmitter 512 is preferably a conventional narrowband binary FSK transmitter operating at a bit rate of one-hundred bps. It will be appreciated that other FSK modulation techniques and bit (symbol) rates can be used as well for the transmitter 512, provided that the symbol duration is large relative to the propagation delay.

A conventional power switch 510, coupled to the decoder/controller 506, is used to control the supply of power to the receiver 504, thereby providing a battery saving function, and to the transmitter 512 for transmitting the acknowledgment response subsequent to the receipt of a paging message, as will be further discussed in detail below.

For purposes of this illustration, it will be assumed that the POCSAG signaling format is utilized, although other signaling formats could be utilized as well. When the address is received by the decoder/controller 506, the received address is compared with one or more addresses stored in a code plug (or code memory) 522, and when a match is detected, an alert signal is generated to alert a user that a selective call message, or page, has been received. The alert signal is directed to a conventional audible alerting device 514 for generating an audible alert or to a conventional tactile alerting device 516 for generating a silent vibrating alert. Switches 520 allow the user of the selective call transceiver to, among other things, select between the audible alert 514 and the tactile alert 516 in a manner well known in the art.

The message information which is subsequently received is stored in a message memory 524, preferably a conventional random access memory, and can be accessed by the user for display using one or more of the switches 520, which provide such additional functions as reset, read, and delete, etc. Specifically, by the use of appropriate functions provided by the switches 520, the stored message is recovered from the message memory 524 and processed by the decoder/controller 506 for displaying by a conventional display 508, which enables the user to view the message. The receipt of the message by the selective call transceiver 110 can automatically generate the acknowledgment response to the selective call base station 102 to inform it that the message was successfully received. Preferably, the user will have the opportunity to input a message by using the switches 520 or some other input devices well known to one of ordinary skill in the arts. When the message is entered, the decoder/controller 506 processes the message by encoding an address derived from the received message to generate the acknowledgment response. The encoded acknowledgment response is then transmitted at a time synchronized by the radio signals received from the selective call base station 102 that originated the paging message, by techniques well known to one of ordinary skill in the art.

The decoder/controller 506 preferably is implemented utilizing a microcomputer similar to the MC68HC05 series microcomputer, manufactured by Motorola, Inc. of Schaumburg, Ill. It will be appreciated that other similar microcomputers can be used as well for the decoder/controller 506, and that the message memory 524 also can be included as a portion of the decoder/controller 506.

With reference to FIG. 6, a timing diagram is shown illustrating an example of a bit pattern 600 of an acknowledgment signal of one of the group of the selective call transceivers 110. As discussed, the acknowledgment signal is transmitted from the selective call transceiver 110 at a lower bit rate than the paging signal is transmitted from the selective call base station 102. The paging signal is, for example, within a range from five-hundred to twenty-four-hundred bps, while the acknowledgment signal is, for example, preferably one hundred bits-per-second. The bit pattern 600 illustrates an example of an acknowledgment signal of one of the selective call transceivers 110 transmitted on one subchannel. The bit pattern 600 depicts bits 602, 606, 610, and 616–618 representing digital "ones" and bits 604, 608, and 612–614 representing digital "zeros". In each acknowledgment response, values of the bits of course depend upon the information being conveyed.

With reference to FIG. 7, a signaling diagram depicts a frequency-domain signal generated in the selective call base station 102 from the received acknowledgment signal in accordance with the preferred embodiment of the present invention. As discussed above, each symbol L5 received by the selective call base station 102 during one of the symbol intervals on an active subchannel is converted into a corresponding frequency domain signal 702, 712. The horizontal axis 704 represents frequency. The vertical direction represents signal magnitude. The preferred modulation scheme is binary FSK with each of the simultaneously responding selective call transceivers 110 assigned to a different subchannel. There are, for example, ten subchannels. The carrier frequency of each of the ten subchannels is located on a central axis 750, which marks the center of each subchannel. A received symbol value preferably is determined from the frequency domain signal by utilizing a frequency domain windowing function to estimate the received carrier frequency, after which the energy associated with each of M predetermined frequency offsets from the carrier frequency is measured and compared. A binary "zero" is represented, for example, by the frequency domain signal 702 offset a predetermined amount 706 below the central axis 750 of the corresponding subchannel, while a binary "one" is represented by the frequency domain signal 712 offset a predetermined amount 708 above the central axis 750.

Figure 8:
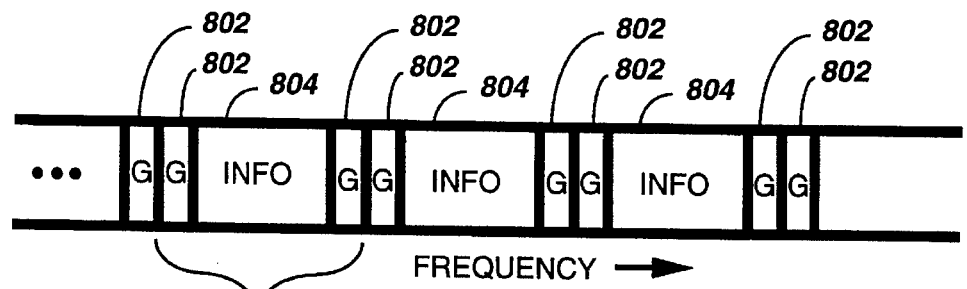
FIG. 8 is a frequency diagram depicting a multiple subchannel signal structure in accordance with the preferred embodiment of the present invention.

With reference to FIG. 8, a frequency diagram 800 depicts a multiple subchannel signal structure transmitted by the selective call transceivers 110 in accordance with the preferred embodiment of the present invention. The signal structure comprises a plurality of subchannels 806, each including an information band 804 surrounded by guard bands 802 below and above the information band. Substantially all of the energy of each subchannel 806, e.g., over ninety-nine percent, is transmitted in the information band 804. No significant amount of the energy of the subchannel, e.g., less than one percent, is transmitted in the guard bands 802.

Figure 9:
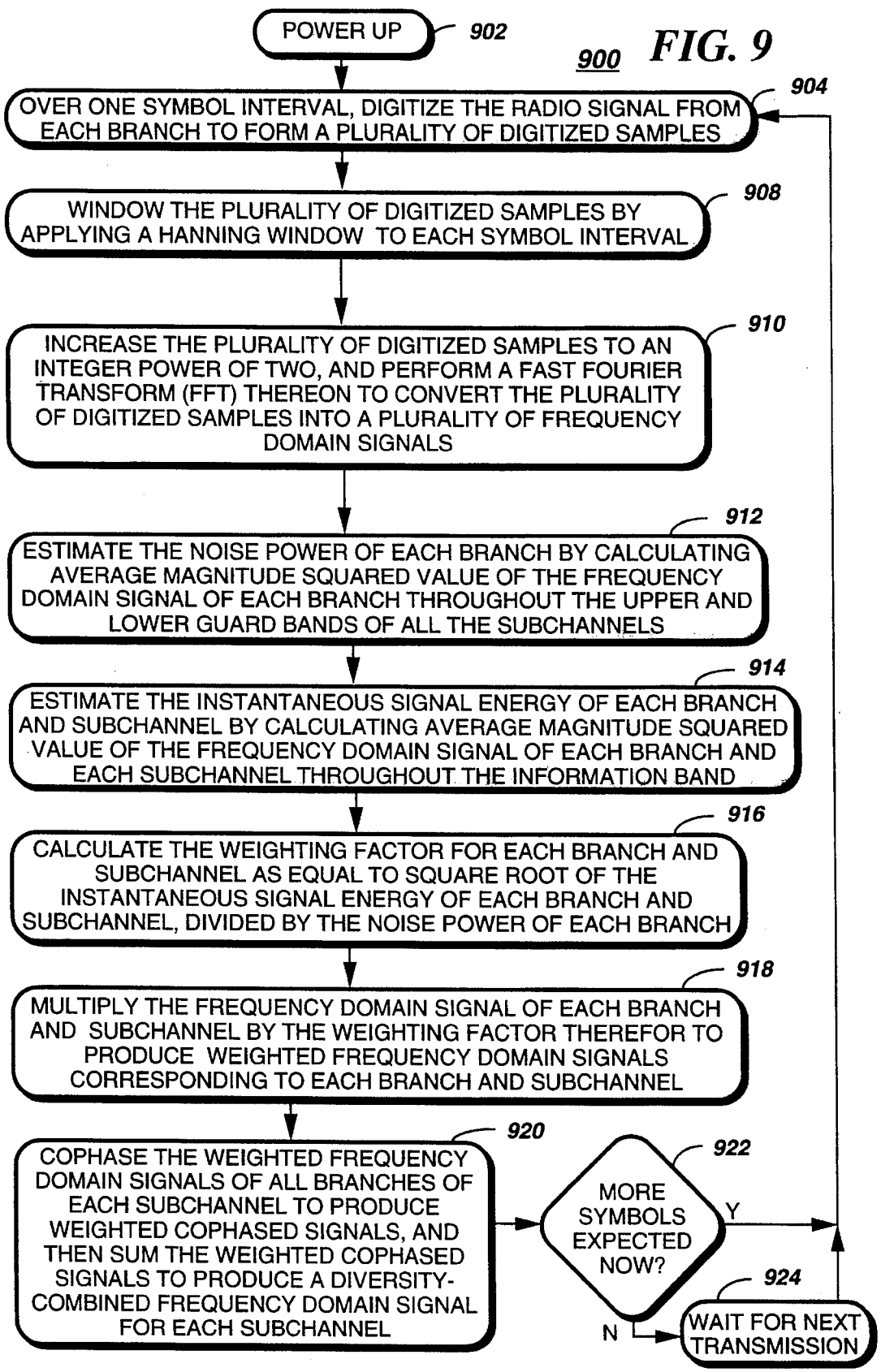
FIG. 9 is a flow chart of operation of the selective call base station in accordance with the preferred embodiment of the present invention.

With reference to FIG. 9, a flow chart of operation of the selective call base station 102 in accordance with the preferred embodiment of the present invention begins with power up 902. After initialization, during one symbol interval the A/D converters 220 digitize 904 the radio signals from the receiver elements 214 of each branch within the selective call base station 102 to form a plurality of digitized samples corresponding to the branch. Next, the branch DSPs 218 convert the plurality of digitized samples into a plurality of frequency domain signals. Each frequency domain signal corresponds to a subchannel of the plurality of subchannels and further corresponds to the branch supplying the signal. Each frequency domain signal comprises a plurality of frequency domain samples corresponding to a plurality of frequencies within the subchannel. The conversion begins by windowing 908 the plurality of digitized samples by applying a Hanning window to the plurality of digitized samples. As stated earlier herein, the Hanning window preferably matches an amplitude Hanning window applied at the transmitter 512 to reduce splatter, as is well known in the art. Next, the branch DSPs 218 increase 910 the plurality of digitized samples to an integer power of two, and perform a Fast Fourier Transform (FFT) on the plurality of digitized samples to generate a plurality of frequency domain samples corresponding to the plurality of frequencies within each subchannel of each branch.

Next, the branch DSPs 218 estimate 912 the average noise power corresponding to each branch by calculating average magnitude squared value of the frequency domain signals corresponding to each branch throughout the upper and lower guard bands of the plurality of subchannels. The branch DSPs 218 also estimate 914 the instantaneous signal energy corresponding to each branch and each subchannel by calculating average magnitude squared value of the frequency domain signal corresponding to each branch and each subchannel throughout the information band. Following that, the branch DSPs 218 calculate 916 the weighting factor for each branch and each subchannel as equal to the square root of the instantaneous signal energy corresponding to each branch and each subchannel, divided by the average noise power corresponding to each branch. Then the branch DSPs 218 multiply 918 the frequency domain signal corresponding to each branch and each subchannel by the weighting factor therefor to produce a plurality of weighted frequency domain signals corresponding to each branch and each subchannel.

It will be appreciated that, alternatively, to estimate the noise power of each branch, more than a single symbol interval, e.g., the most recent eight adjacent symbol intervals, can be utilized. Estimating the average noise power by measuring and averaging the guard band signals over several symbol intervals can produce a more precise estimate of the average noise power.

The weighted frequency domain signals are fed to the combiner DSP 222. The combiner DSP 222 cophases 920 the plurality of weighted frequency domain signals that correspond to all the branches of each subchannel to produce a plurality of weighted cophased frequency domain signals. The cophasing is performed by examining the samples of the magnitude squared FFT corresponding to a subchannel of each branch to locate the largest value for the subchannel. When this point has been located, the frequency index where the maximum occurred, the phase of the weighted FFT at the frequency index, and the branch on which it occurred are stored in the memory 406. Next, a phase shift is applied mathematically across the information band of the subchannel of the remaining branches, i.e., the branches that did not contain the largest value for the subchannel. The phase shift applied is such that at the frequency index where the maximum occurred, all of the branches have the same phase as that stored for the weighted FFT of the maximum branch at the frequency index. The cophasing process is repeated for each of the subchannels until all of the subchannels have been cophased.

Following cophasing, the combiner DSP 222 sums the plurality of weighted cophased frequency domain signals to produce the diversity-combined frequency domain signal for each subchannel. At this point the diversity-combined frequency domain signal for each subchannel is ready for carrier tracking and symbol detection. The combiner DSP 222 checks 922 whether more symbols are expected. If so, flow returns to step 904 to digitize a next symbol interval. If not, i.e., if all of a predetermined number of symbols for the transmission cycle have been received, then the selective call base station 102 waits 924 for a next transmission from the selective call transceivers 110.

Preferably, carrier tracking and symbol detection are performed in accordance with the U.S. patent application Ser. No. 08/316,956 entitled "METHOD AND APPARATUS FOR CARRIER TRACKING AND DEMODULATION", by Liberti et al., filed Oct. 10, 1994, which patent application is hereby incorporated herein by reference.

Figure 10:
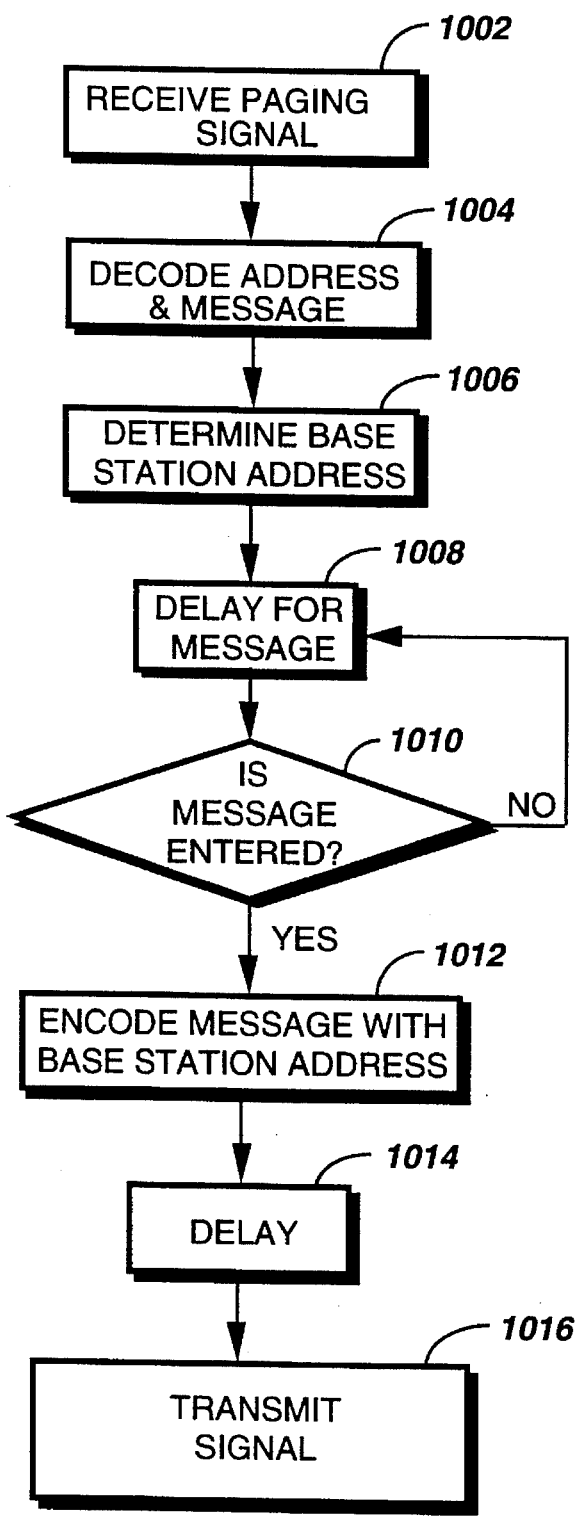
FIG. 10 is a flow chart of the operation of the conventional selective call transceiver.

FIG. 10 is a flow chart illustrating the operation of the selective call transceiver 110. The selective call transceiver 110 receives the paging signal from the selective call base station 102, step 1002, and decodes its address and a message, if any, contained therein, step 1004. The paging signal preferably comprises a time of transmission which is also decoded, step 1004, to enable the selective call transceiver 110 to calculate a delay time before it responds by sending the acknowledgment response. The address of the selective call base station 102 is also decoded from the received paging signal, step 1006. The selective call transceiver 110 delays until a message is entered or until the time to transmit the acknowledgment response, step 1008. Preferably, the selective call transceiver 110 provides an option to enable the user to enter, by techniques well known in the art, a message to be incorporated in the acknowledgment response, step 1010. If the message is not entered or the time to transmit has not elapsed, the process continues to step 1008. Alternatively, if a message is entered, the message is encoded with the address of the selective call base station 102, step 1012, or if the time has elapsed, the acknowledgment signal is encoded with a default message. In some instances, the selective call transceiver 110 may not need to receive an address from the transmitting selective call base station 102, and simply transmits its message on its preassigned subchannel to the selective call base station 102. Upon receipt and encoding of the acknowledgment message, the selective call transceiver 110 delays until its time to transmit the acknowledgment response, step 1014. The acknowledgment response is then transmitted to the selective call base station 102, step 1016. In this way, the plurality of selective call transceivers 110 respond substantially simultaneously with one another. Because of the low symbol rate used for the acknowledgment response, the symbols from the plurality of selective call transceivers 110 will also be received substantially simultaneously at the selective call base station 102.

Thus, it should be apparent by now that the preferred embodiment of the present invention provides an economical method and apparatus for receiving and maximal ratio combining a plurality of radio signals received from a plurality of branches, wherein each of the radio signals comprises multiple subchannels. By performing a Fast Fourier Transform on the received radio signal of each branch, all of the multiple subchannels are converted economically into frequency domain signals, utilizing a single DSP per branch. The frequency domain signals are weighted for maximal ratio combining, and are thereafter cophased and combined by a combiner DSP, thereby providing a nearly optimum diversity combiner for multi-channel faded narrowband FSK signals.

What is claimed is:

1. A method for diversity-combining a plurality of radio signals, each radio signal received from one of a plurality of branches fed from a corresponding plurality of antennas, and each radio signal comprising a plurality of subchannels, the method comprising the steps of:

digitizing the radio signal from each branch of the plurality of branches to form a plurality of digitized samples corresponding thereto;

converting the plurality of digitized samples into a plurality of frequency domain signals, each frequency domain signal corresponding to a subchannel of the plurality of subchannels and further corresponding to a branch of the plurality of branches, and each frequency domain signal comprising a plurality of frequency domain samples corresponding to a plurality of frequencies within each subchannel;

determining a weighting factor for each branch and each subchannel, the weighting factor being determined from instantaneous signal energy and noise power, the instantaneous signal energy and the noise power calculated from the plurality of frequency domain signals;

multiplying the frequency domain signal corresponding to each branch and each subchannel by the weighting factor therefor to produce a plurality of weighted frequency domain signals corresponding to each branch and each subchannel; and combining the plurality of weighted frequency domain signals that correspond to all the branches of each subchannel to produce a diversity-combined frequency domain signal for each subchannel.

2. The method of claim 1, wherein the combining step comprises the steps of:

cophasing the plurality of weighted frequency domain signals that correspond to all the branches of each subchannel to produce a plurality of weighted cophased frequency domain signals; and summing the plurality of weighted cophased frequency domain signals to produce the diversity-combined frequency domain signal for each subchannel.

3. The method of claim 1, wherein each subchannel includes upper and lower guard bands comprising ranges of frequencies at which no significant amount of energy is transmitted in the plurality of radio signals, and wherein the determining step comprises the steps of:

calculating a first average magnitude squared value of the plurality of frequency domain signals corresponding to each branch throughout the upper and lower guard bands of the plurality of subchannels; and estimating the noise power corresponding to each branch to be equal to the first average magnitude squared value calculated therefor.

4. The method of claim 3, wherein each subchannel includes an information band comprising a range of frequencies within which substantially all energy of the subchannel is transmitted by the plurality of radio signals, and wherein the determining step further comprises the steps of:

calculating a second average magnitude squared value of the frequency domain signal corresponding to each branch and each subchannel throughout the information band; and estimating the instantaneous signal energy corresponding to each branch and each subchannel to be equal to the second average magnitude squared value calculated.

5. The method of claim 4, wherein the determining step further comprises the step of calculating the weighting factor for each branch and each subchannel as equal to a square root of the instantaneous signal energy corresponding to each branch and each subchannel, divided by the noise power corresponding to each branch.

6. The method of claim 1, wherein the converting step comprises the steps of:
   increasing the plurality of digitized samples to an integer power of two; and
   thereafter performing a Fast Fourier Transform (FFT) on the plurality of digitized samples to generate the plurality of frequency domain samples corresponding to the plurality of frequencies within each subchannel.

7. The method of claim 6, wherein the converting step further comprises the step of windowing the plurality of digitized samples by applying a Hanning window prior to the step of increasing the plurality of digitized samples to an integer power of two.

8. An apparatus for diversity-combining a plurality of radio signals, each radio signal received from one of a plurality of branches fed from a corresponding plurality of antennas, and each radio signal comprising a plurality of subchannels, the apparatus comprising:
   a plurality of analog-to-digital (A/D) converters coupled to the plurality of branches for digitizing the radio signal from each branch of the plurality of branches to form a plurality of digitized samples corresponding thereto; and
   a plurality of branch processors coupled to the plurality of A/D converters for converting the plurality of digitized samples into a plurality of frequency domain signals, each frequency domain signal corresponding to a subchannel of the plurality of subchannels and further corresponding to a branch of the plurality of branches, and each frequency domain signal comprising a plurality of frequency-domain samples corresponding to a plurality of frequencies within each subchannel, each branch processor comprising:
      a weighting factor element for determining a weighting factor for each subchannel of the branch from which the branch processor receives the radio signal after digitization, the weighting factor being determined from instantaneous signal energy and noise power, the instantaneous signal energy and the noise power calculated from the plurality of frequency domain signals; and
      a multiplier coupled to the weighting factor element for multiplying the frequency domain signal corresponding to the branch and each subchannel thereof by the weighting factor therefor to produce a plurality of weighted frequency domain signals corresponding to the branch and each subchannel,
   wherein the apparatus further comprises a combiner coupled to the plurality of branch processors for combining the plurality of weighted frequency domain signals that correspond to all the branches of each subchannel to produce a diversity-combined frequency domain signal for each subchannel.

9. The apparatus of claim 8, wherein the combiner comprises:
   a cophaser for cophasing the plurality of weighted frequency domain signals that correspond to all the branches of each subchannel to produce a plurality of weighted cophased frequency domain signals; and
   a summer coupled to the cophaser for summing the plurality of weighted cophased frequency domain signals to produce the diversity-combined frequency domain signal for each subchannel.

10. The apparatus of claim 8, wherein each subchannel includes upper and lower guard bands comprising ranges of frequencies at which no significant amount of energy is transmitted in the plurality of radio signals, and wherein the weighting factor element comprises a noise estimator coupled to one of the plurality of branches for calculating a first average magnitude squared value of the plurality of frequency domain signals corresponding to the branch throughout the upper and lower guard bands of the plurality of subchannels, and for estimating the noise power corresponding to the branch to be equal to the first average magnitude squared value calculated therefor.

11. The apparatus of claim 10, wherein each subchannel includes an information band comprising a range of frequencies within which substantially all energy of the subchannel is transmitted by the plurality of radio signals, and wherein the weighting factor element further comprises a signal energy estimator coupled to the one of the plurality of branches for calculating a second average magnitude squared value of the frequency domain signal corresponding to the branch and to each subchannel thereon throughout the information band, and for estimating the instantaneous signal energy corresponding to the branch and each subchannel thereon to be equal to the second average magnitude squared value calculated therefor.

12. The apparatus of claim 11, wherein the weighting factor element further comprises a calculator coupled to the noise estimator and to the signal energy estimator for calculating the weighting factor for the branch and each subchannel as equal to a square root of the instantaneous signal energy corresponding to the branch and each subchannel, divided by the noise power corresponding to the branch.

13. The apparatus of claim 8, wherein each branch processor further comprises:
   a zero-pad element for increasing the plurality of digitized samples to an integer power of two; and
   a Fast Fourier Transform (FFT) element coupled to the zero-pad element for performing a Fast Fourier Transform on the plurality of digitized samples after zero-padding to generate the plurality of frequency domain samples corresponding to the plurality of frequencies within each subchannel.

14. The apparatus of claim 13, wherein each branch processor further comprises a windowing element coupled to the zero-pad element for windowing the plurality of digitized samples by applying a Hanning window prior to the step of increasing the plurality of digitized samples to an integer power of two.

15. A selective call base station for use in a selective call communication system, the selective call base station comprising:
   a controller for controlling the selective call base station;
   a base transmitter coupled to the controller for transmitting selective call signals to selective call transceivers operating in the selective call communication system;
   a plurality of branches comprising a plurality of antennas and a corresponding plurality of receiver elements for receiving from transmitters within the selective call transceivers a plurality of radio signals, each radio signal received by one of the plurality of receiver elements fed from one of the plurality of antennas and each radio signal comprising a plurality of subchannels, the plurality of receiver elements also coupled to an apparatus for diversity-combining the plurality of radio signals, the apparatus comprising:
      a plurality of analog-to-digital (A/D) converters coupled to the plurality of branches for digitizing the radio signal from each branch of the plurality of branches to form a plurality of digitized samples corresponding thereto;

a plurality of branch processors coupled to the plurality of A/D converters for converting the plurality of digitized samples into a plurality of frequency domain signals, each frequency domain signal corresponding to a subchannel of the plurality of subchannels and further corresponding to a branch of the plurality of branches, and each frequency domain signal comprising a plurality of frequency domain samples corresponding to a plurality of frequencies within each subchannel, each branch processor comprising:

a weighting factor element for determining a weighting factor for each subchannel of the branch from which the branch processor receives the radio signal after digitization, the weighting factor being determined from instantaneous signal energy and noise power, the instantaneous signal energy and the noise power calculated from the plurality of frequency domain signals; and a multiplier coupled to the weighting factor element for multiplying the frequency domain signal corresponding to the branch and each subchannel thereof by the weighting factor therefor to produce a plurality of weighted frequency domain signals corresponding to the branch and each subchannel, wherein the apparatus further comprises a combiner coupled to the plurality of branch processors for combining the plurality of weighted frequency domain signals that correspond to all the branches of each subchannel to produce a diversity-combined frequency domain signal for each subchannel.

16. The selective call base station of claim 15, wherein the combiner comprises:

a cophaser for cophasing the plurality of weighted frequency domain signals that correspond to all the branches of each subchannel to produce a plurality of weighted cophased frequency domain signals; and a summer coupled to the cophaser for summing the plurality of weighted cophased frequency domain signals to produce the diversity-combined frequency domain signal for each subchannel.

17. The selective call base station of claim 15, wherein each subchannel includes upper and lower guard bands comprising ranges of frequencies at which no significant amount of energy is transmitted in the plurality of radio signals, and wherein the weighting factor element comprises a noise estimator coupled to one of the plurality of branches for calculating a first average magnitude squared value of the plurality of frequency domain signals corresponding to the branch throughout the upper and lower guard bands of the plurality of subchannels, and for estimating the noise power corresponding to the branch to be equal to the first average magnitude squared value calculated therefor.

18. The selective call base station of claim 17, wherein each subchannel includes an information band comprising a range of frequencies within which substantially all energy of the subchannel is transmitted by the plurality of radio signals, and wherein the weighting factor element further comprises a signal energy estimator coupled to the one of the plurality of branches for calculating a second average magnitude squared value of the frequency domain signal corresponding to the branch and to each subchannel thereon throughout the information band, and for estimating the instantaneous signal energy corresponding to the branch and each subchannel thereon to be equal to the second average magnitude squared value calculated therefor.

19. The selective call base station of claim 18, wherein the weighting factor element further comprises a calculator coupled to the noise estimator and to the signal energy estimator for calculating the weighting factor for the branch and each subchannel as equal to a square root of the instantaneous signal energy corresponding to the branch and each subchannel, divided by the noise power corresponding to the branch.

20. The selective call base station of claim 15, wherein each branch processor further comprises:

a zero-pad element for increasing the plurality of digitized samples to an integer power of two; and a Fast Fourier Transform (FFT) element coupled to the zero-pad element for performing a Fast Fourier Transform on the plurality of digitized samples after zero-padding to generate the plurality of frequency domain samples corresponding to the plurality of frequencies within each subchannel.

21. The selective call base station of claim 20, wherein each branch processor further comprises a windowing element coupled to the zero-pad element for windowing the plurality of digitized samples by applying a Hanning window prior to the step of increasing the plurality of digitized samples to an integer power of two.

* * * * *

UNITED STATES PATENT AND TRADEMARK OFFICE
CERTIFICATE OF CORRECTION

PATENT NO. : 5,550,872
DATED      : August 27, 1996
INVENTOR(S) : Joseph C. Liberti, Jr. et al.

It is certified that error appears in the above-indentified patent and that said Letters Patent is hereby corrected as shown below:

Column 4, line 66, delete "22" and add--122--.

Signed and Sealed this

Twenty-fifth Day of November, 1997

Attest:

BRUCE LEHMAN

Attesting Officer

Commissioner of Patents and Trademarks